United States Patent [19]

Hung et al.

[11] Patent Number: 5,074,049
[45] Date of Patent: Dec. 24, 1991

[54] VIAL

[76] Inventors: Wen-Pin Hung; Wen-Jenn Horng, both of No. 28, Alley 1, Ta-Ho I Lane,, Ta-Ho Li, Hsi Tun Dist., Taichung City, Taiwan

[21] Appl. No.: 644,921

[22] Filed: Jan. 23, 1991

[51] Int. Cl.$^5$ .......................... G01C 5/04; G01C 9/22
[52] U.S. Cl. .......................................................... 33/367
[58] Field of Search ................. 33/367, 377, 378, 365, 33/348; 73/323

[56] References Cited

U.S. PATENT DOCUMENTS

| | | | |
|---|---|---|---|
| 375,450 | 12/1987 | Karr | 33/367 |
| 1,576,470 | 3/1926 | Richardson | 33/367 |
| 2,150,048 | 3/1939 | Boyd | 33/367 |
| 3,183,716 | 5/1965 | Lyon | 73/323 |
| 4,991,302 | 2/1991 | Brewer | 33/367 |

Primary Examiner—Harry N. Haroian
Attorney, Agent, or Firm—Ladas & Parry

[57] ABSTRACT

A level vail includes a pair of elongated tubes, each having a top open end and a bottom open end. A pipe has two ends, respectively connected to the bottom ends of the elongated tubes. Water is contained in each of the elongated tubes, in each of which a floating article is also provided. A communicating member is provided on the top open end of each of the elongated tubes. One communicating member has at least one passage which communicate the interior of the elongated tube and the external atmsophere. A blocking member is movably disposed in the communicating member so that the passage of the communicating member can be opened and closed selectively.

2 Claims, 6 Drawing Sheets

VIAL

BACKGROUND OF THE INVENTION

1. Field of Invention

The invention relates to a measuring instrument, more particularly to a level vial which is used to measure whether a surface is level.

2. Discussion of the Related Art

A level vial is widely used measuring instrument for measuring the level of a surface. In construction works or installation of machines or household furniture such as installing a window in a house, the first thing an engineer will be cautious of is the alignment of the window related to the wall and the ground level. If the window is mounted improperly, it will most likely not be aligned with a true vertical line, and will therefore not look right. In the same manner, if a punch machine is mounted inclinedly with respect to a true horizontal line, the operator may encounter difficulty in operating it properly. A level vial is therefore used for measuring whether the surface on which a window or a machine is to be mounted is truly horizontal.

But there are things that occasionally need to be mounted on a certain inclination with respect to a true horizontal or vertical line. The absolute inclination with respect to a true horizontal line can also be measured with a level vial.

FIGS. 1(A) and (B) show two kinds of highly sophisticated level vials. FIG. 1(A) shows a theodolite of prior art which is used to measure the horizontal and vertical level of a surface. FIG. 1(B) is an automatic level vial of prior art, containing a liquid vial which cannot be witnessed from outside. Their sophistication though, makes them relatively easy to damage.

For general use, a flexible transparent plastic pipe (1) containing water (2) as shown in FIG. 2 is generally substituted for a level vial. But this kind of vial has the following defects.

(1) Since there is no closing means on the ends of the pipe, two people are required to use this device, one to hold each end of the pipe until water in the pipe stablizes.

(2) Water may spill out of the pipe when the pipe is moved to a working site.

(3) In places where there is no water to fill the pipe, the instrument is not workable.

(4) Dirt or unnecessary things be get into the pipe, which could spoil the water inside of the same.

(5) Water by itself is a transparent matter, the plastic pipe is also transparent, therefore it is sometimes hard to distinguish the water level in the pipe.

(6) If the user accidentally raises one end of the pipe, the water may run out of the pipe, which is not very convenient for the user.

SUMMARY OF THE INVENTION

The main object of the present invention is to provide a level vial which is free of the above drawbacks, and having a means to indicate the water level which is easily visible from outside of the level vial.

According to the present invention, a level vial includes a pair of elongated tubes, each of which having a top end and a bottom end, and a pipe having two ends each respectively connected to the bottom ends of the elongated tubes. Each of the elongated tubes contains water and a floating article therein. A communication member with at least a passage to communicate the interior of the level vial with the exterior environment, is disposed on the top end of the same. A blocking member is movably disposed in the communicating member so as to close and open the passages of the same.

BRIEF DESCRIPTION OF THE DRAWINGS

Other features and advantages of the present invention will become apparent in the following detailed description, including drawings, all of which show a non-limiting form of the invention, and of which:

FIG. 3 (B) shows a cross sectional view of a preferred embodiment of a level vial of the present invention, shown with the communication means open.

FIG. 4 (B) shows a cross sectional view of FIG. 4(A), shown with the communication means open.

DETAILED DESCRIPTION OF THE PREFERRED EMBODIMENT

Figure 1A:
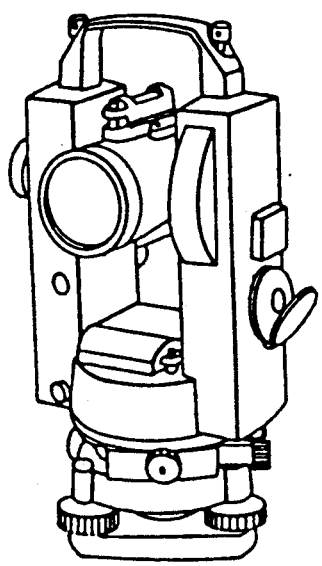
FIG. 1 shows a theodolite and an automatic level vial of the prior art.
Figure 1B:
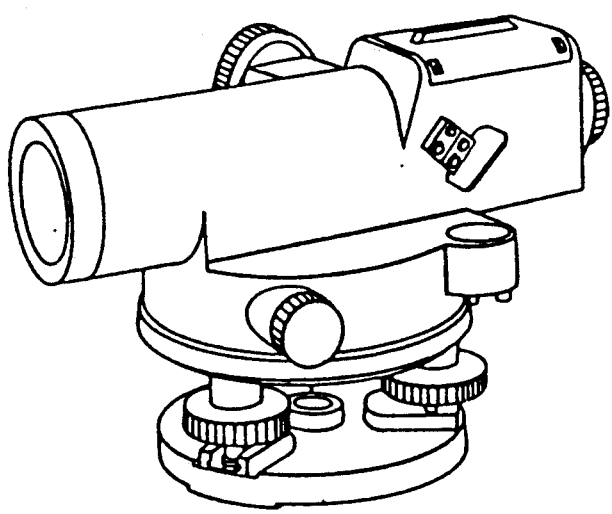
Figure 2:
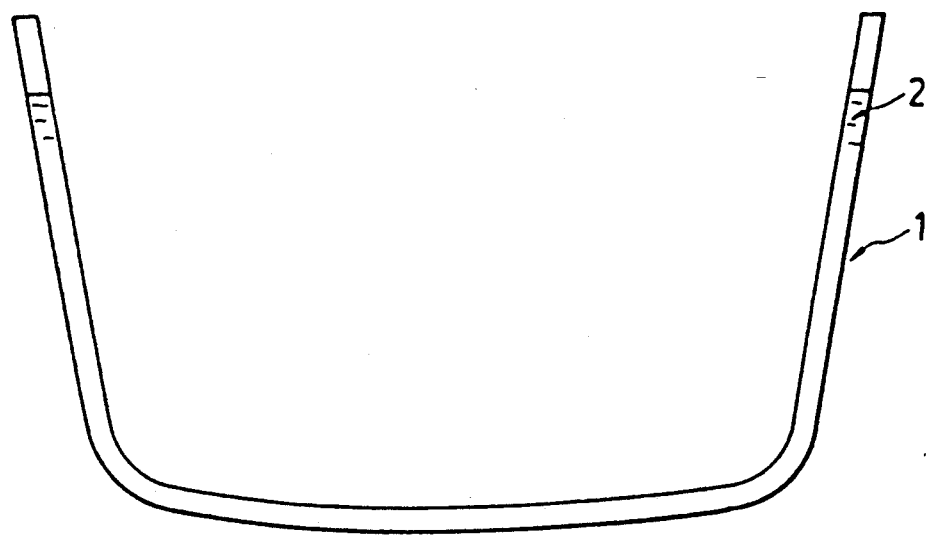
FIG. 2 shows a conventional level vial of the prior art.
Figure 3A:
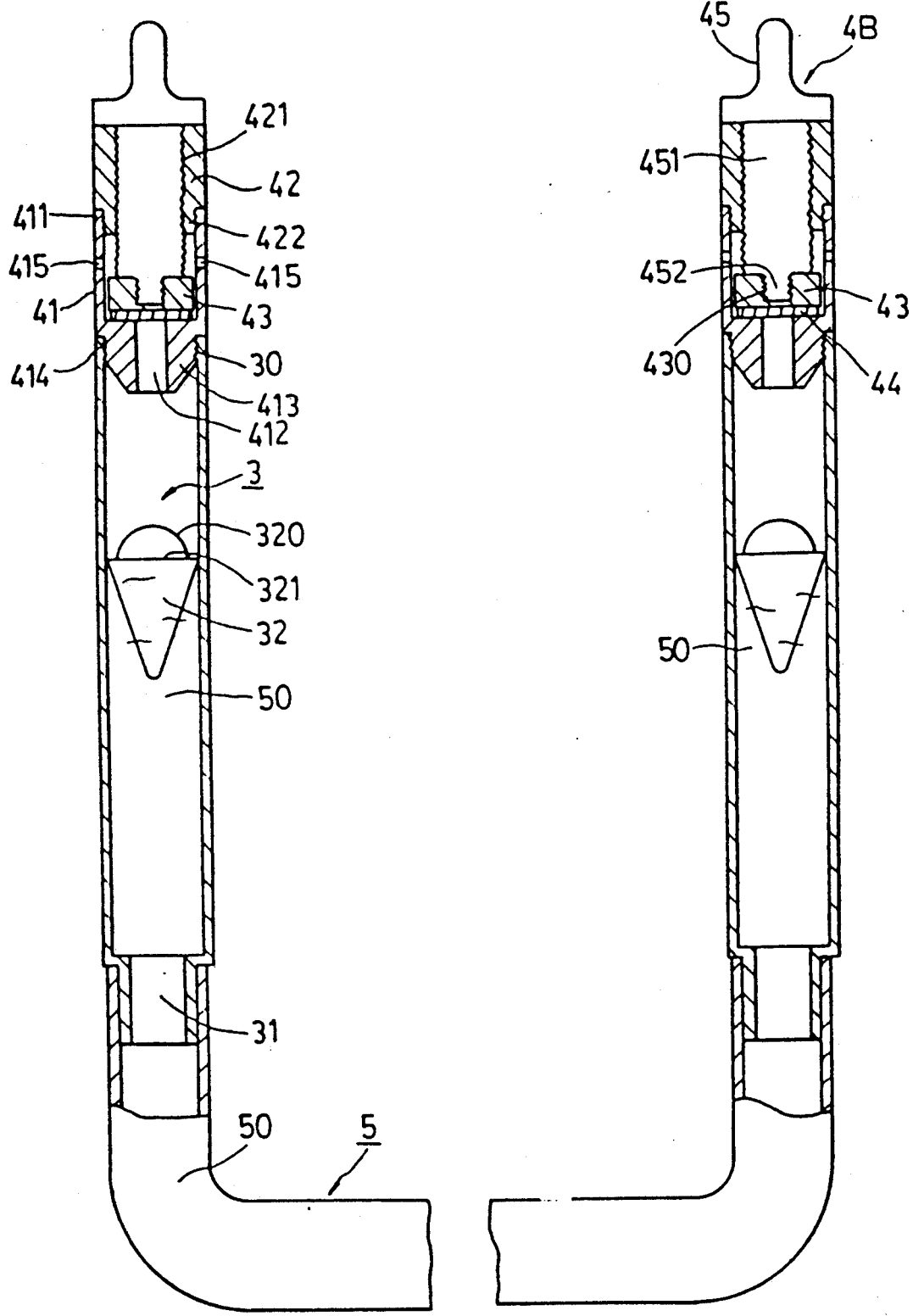
FIG. 3 (A) shows a cross sectional view of a preferred embodiment of a level vial of the present invention, shown with the communication means closed.
Figure 3B:
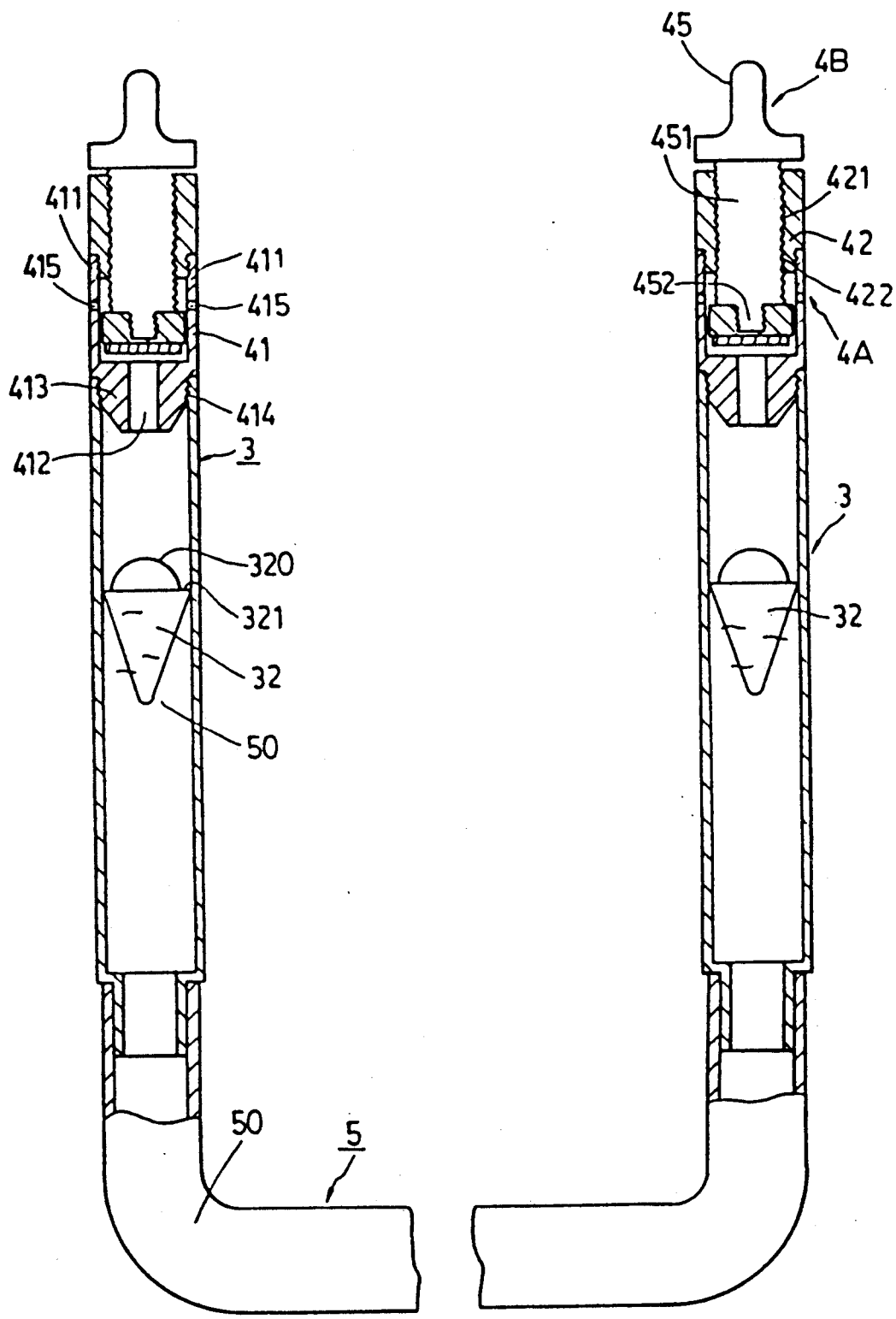

Referring to FIGS. 3(A) and 3(B), a level vial of the present invention includes a pair of elongated tubes (3), a floating article (32), a communicating member (41) and a blocking member (42).

Each of the elongated tubes (3) has a top open end and a bottom open end, the bottom open ends (31) of the elongated tubes are connected to two ends of a plastic pipe (5). Water (50) is contained in each of the elongated tubes, and a floating article (32) is disposed therein. The top open end of the elongated tube has an internal thread (30).

The communicating member includes a first tubular member (41) with a plurality of holes (415) on the wall surface of the same, the first tubular member also has a top open end and a closed bottom end. The top open end has an internal thread (411) therein, and the closed bottom end (413) has a central through-hole (412) and an external thread (414) thereon. The external thread (414) engages the internal thread (30) of the top end of the elongated tube.

The blocking member includes a circular plate (44) disposed on the central through-hole (412) of the closed bottom end. A disc member (43) with a threaded groove (452) thereon is disposed fixedly on the circular plate. Since the diameters of the disc member and the circular plate are smaller than the inner diameter of the internal wall surface of the elongated tube, a clearance is left between the internal wall surface of the same and the peripheral surfaces of the disc member and the circular plate. A second tubular member (42) has a first open end and a second open end. The second open end has an external thread (422) thereon, and an internal thread (421) extends from the first end to the second end. The external thread (422) on the second end of the second tubular member engages the internal thread (411) on the top end of the first tubular member.

A bolt (4B) has a head (45) and a shank. The shank has a first and a second section with differing diameters. The second section extends from the first section such that it has a second thread (452) and the first section has a first thread (451). When the bolt (4B) is inserted into the second tubular member (42), the second thread fixedly engages the threaded groove (430) of the disc member, while the first thread on the first section threadably engages the internal thread (421) of the second tubular member.

When the instrument is thus assembled, it is ready to be used. During operation, it is sometimes found that air bubbles are trapped in the vial, which may lead to inaccuracy in measuring the level of a surface. The air can be let out by simply threadably raising the bolt (4B), which pulls the circular plate member away from the through-hole in the closed bottom end of the first tubular member. (See FIG. 3(B)). The air escapes through the through-hole (412), the clearance and the holes (415) in the wall of the first tubular member. After the air bubble has escaped, one can close the elongated tube as shown in FIG. 3(A). But during operation, the elongated tube must slightly let open, only then the vial can be operable.

Since the pipe (5) and the elongated tubes are mostly made of transparent material, it is sometimes difficult to find the water level. For better visibility, a ball (320) can be mounted on the top (321) of the floating article (32). Alternatively, colored ring or fluorescent ring (321') can be mounted on the floating article (32') for easy visibility, see in FIGS. 4(A) and 4(B). In the event, if a person happens to hold one end of the instrument too high, the floating article in one of the elongated tubes will rise to block the through-hole of the communicating member. Therefore, water can not run out from the instrument as long as the tubes are substantially vertical with the bolt end up, which is one of the distinguishing features of the present invention.

Figure 4A:
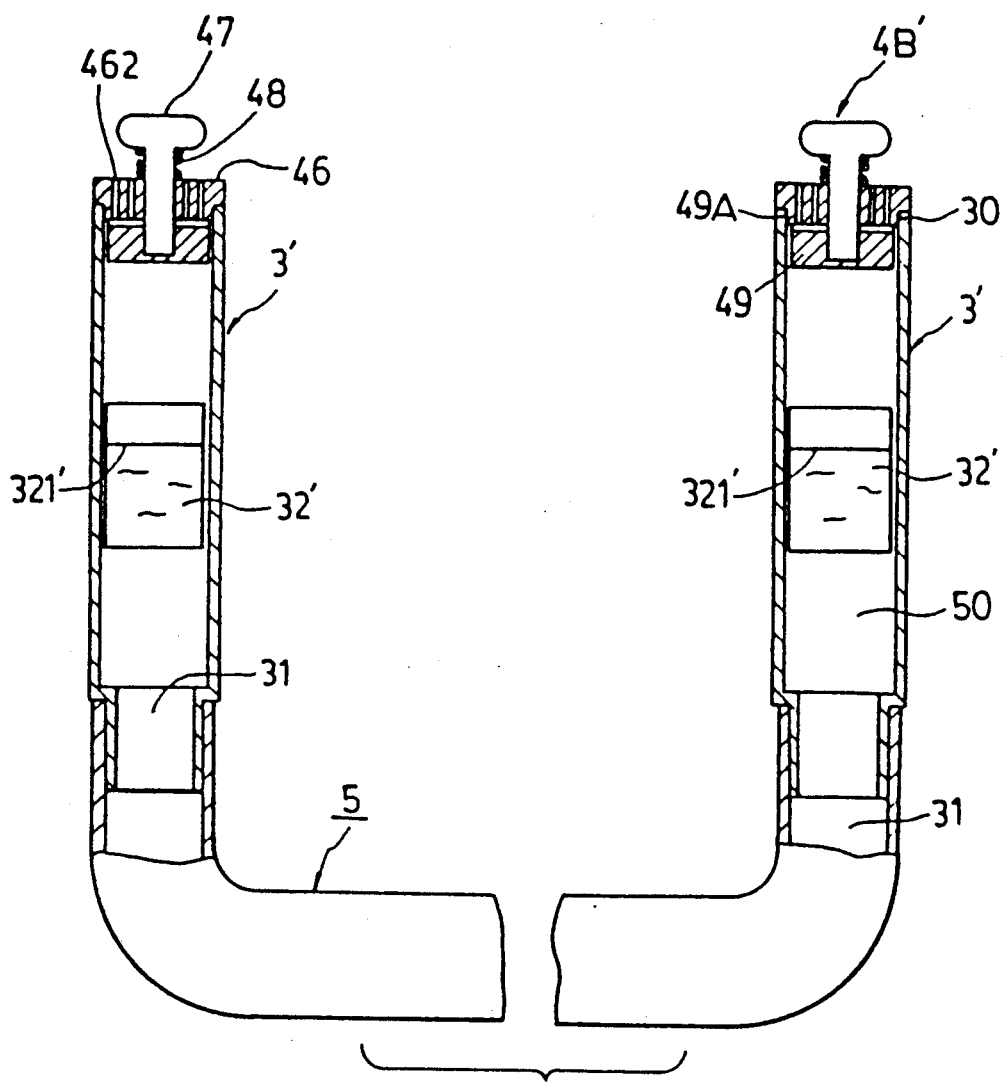
FIG. 4 (A) shows a cross sectional view of a second preferred embodiment of a level vial of the present invention, shown with the communication means closed.
Figure 4B:
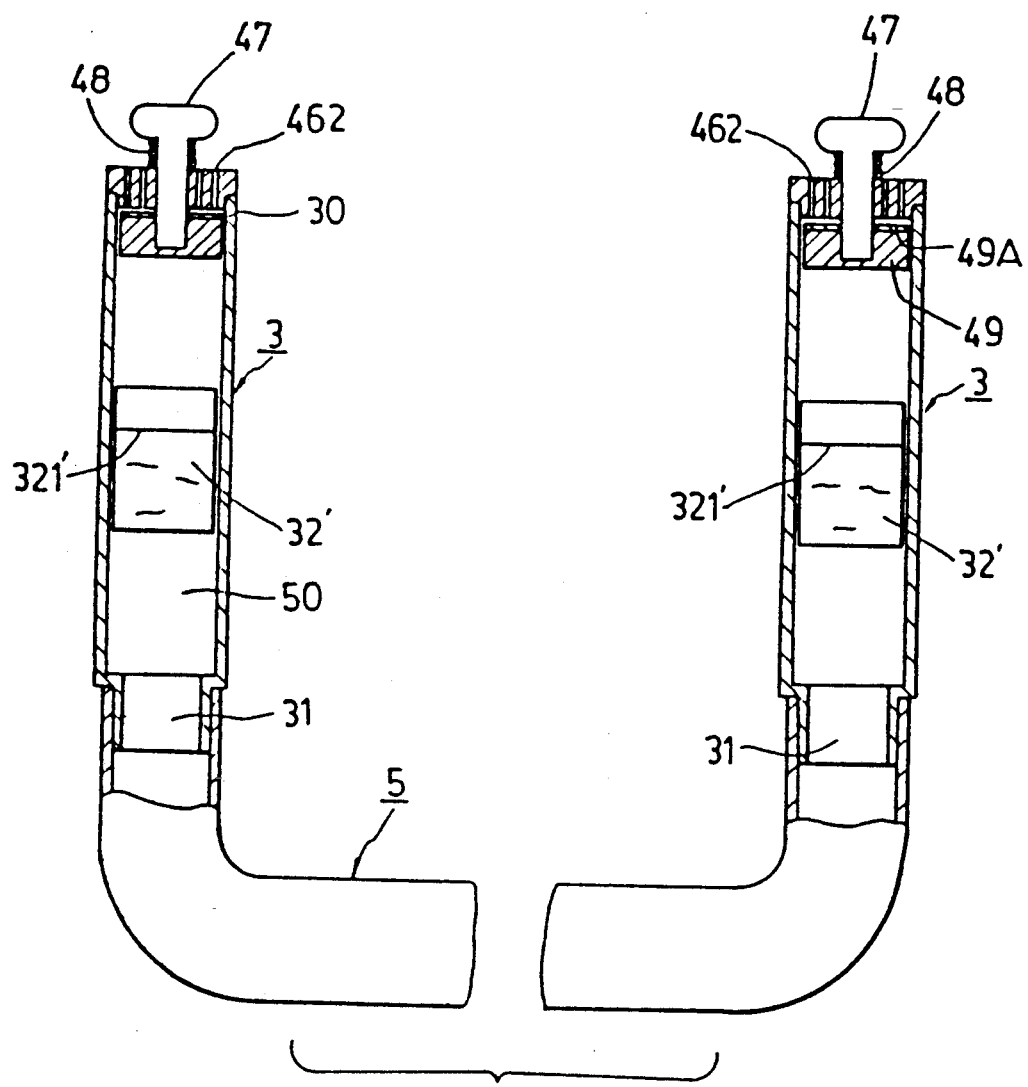

In another embodiment, the communicating member (46) having a cylinder shape with a plurality of passages (462), and is threadably (49A) mounted on the top open end of the elongated tube 3'. In this embodiment, a coil spring (48) is provided between the head (47) of the bolt (4B') and the top surface of the communicating member, abutting both at the same time in such a way that the circular plate (49) tightly seals the passages (462) of the communicating member, as shown in FIG. 4(A). Note that the circular plate is large enough to cover all the passages. When one wants to equalize the air pressure in each end of vial, thus preparing for an accurate reading, one need press the bolt (4B') downward so that the interior of the vial is communicated with the environment via the clearance between the internal wall surface of the elongated tube (3') and the peripheral surfaces of the circular plate (49A) and the disc member (49), as seen in FIG. 4(B).

With the invention thus explained, it is obvious to those skilled in the art that various modifications and variations can be made without departing from the spirit and scope of the present invention. It is therefore intended that this invention be limited only as indicated in the appended claims.

We claim:

1. A level vial having a pair of elongated tubes, each of which has a top open end and a bottom open end, and a pipe having two ends respectively connected to said bottom open ends of the elongated tubes so as to contain water therein, said level vial comprising:

a communicating member provided on said top open end of each of said elongated tubes, said communicating member having a first tubular member with an upper open end and a lower closed end, and a second tubular member with a first end and a second end, the lower closed end of the first tubular member being threaded externally to engage the top open end of the elongated tube and having a central through-hole as a passage in communication with the elongated tube, said second end of the second tubular member being threaded externally so as to engage the upper open end of the first tubular member, a plurality of holes being formed in the wall of the first tubular member for communicating to exterior enviroment;

a blocking member movably disposed in the communicating member so as to close and open said passage, said blocking member including a disc member with a threaded groove formed thereon and a same diameter circular stacking plate attached thereunder, and a bolt with a lower end portion engaging the threaded groove of the disc member and with a body portion engaging internal thread of said second tubular member, said disc member being disposed in the first tubular member, but leaving a clearance between internal wall surface of the first tubular member and peripheral surfaces of the disc member and the circular stacking plate, in such a manner that said circular stacking plate is capable of covering the through-hole of the first tubular member when the bolt is screwed down into the tubular members, and being raised to uncover the through-hole when the bolt is screwed up thereby communicating the through-hole with said holes in the wall of the first tubular member; and a floating article on top of the water in the elongated tube, said floating article including a ball provided on top of the article and adapted for blocking said through-hole when the water rises to the vicinity of the top end of the elongated tube.

2. A level vial having a pair of elongated tubes, each of which has a top open end and a bottom open end, and a pipe having two ends respectively connected to said bottom ends of the elongated tubes so as to contain water therein, said level vial comprising:

a communicating member provided on said top open end of each said elongated tube, said communicating member including a solid cylinder member with a first end and a second end which is threaded externally to engage with internal thread of the top open end of the elongated tube, and a plurality of through-holes as a passage extending from the first end to the second end of the cylinder member for communicating interior of the elongated tube with exterior environment;

a blocking member movably disposed on the communicating member so as to close and open said passage, said blocking member including a disc member with a threaded groove formed on top of the disc member and with a circular plate disposed also on the top of the disc member, and a bolt with a head and a shank, said shank passing through a torsion spring, which stands between the first end of the cylinder member and the head of the bolt, and the cylinder member into the elongated tube to engage the circular plate and the threaded groove in the disc member, said circular plate and the disc member being of same diameters which are smaller than inner diameter of the elongated tube to leave a clearance between the internal wall surface of the elongated tube and peripheral surfaces of the disc member and the circular plate, so that the circular plate on the disc member abuts the second end of the cylinder member to seal the holes as the torsion spring urges the head of the bolt upwardly and moves away from the second end to open the holes when the head of the bolt is pressed down and the spring is compressed thereby; and a floating article on top of the water in the elongated tube, on top of said floating article being provided a colored fluorescent ring to enhance readability by a user.

* * * * *